United States Patent [19]

Holzer et al.

[11] Patent Number: 5,451,756

[45] Date of Patent: Sep. 19, 1995

[54] PROCESS AND EQUIPMENT FOR COUNTERFEIT-PROOF OPERATION OF GAMBLING MACHINES WITH CHIP CARDS

[75] Inventors: Walter Holzer, Drosteweg 19, D-Meersburg, 88709; Ingo Sausmekat, Remscheid, both of Germany

[73] Assignee: Walter Holzer, Germany

[21] Appl. No.: 223,169

[22] Filed: Apr. 5, 1994

[30] Foreign Application Priority Data

Apr. 6, 1993 [DE] Germany ............... 43 11 561.6

[51] Int. Cl.⁶ .............................................. G06F 7/08
[52] U.S. Cl. ........................................ 235/381; 235/375; 235/382; 235/382.5
[58] Field of Search ............ 235/382, 375, 381, 382.5; 364/412

[56] References Cited

U.S. PATENT DOCUMENTS 4,900,906 2/1990 Pusic ................................ 235/381
5,038,022 8/1991 Lucero ............................. 235/380

FOREIGN PATENT DOCUMENTS 0015081 9/1980 European Pat. Off. .
0310485 4/1989 European Pat. Off. .
3441518 5/1986 Germany .
3533740 3/1987 Germany .
3533736 4/1987 Germany .
3537178 4/1987 Germany .

*Primary Examiner*—Harold Pitts
*Attorney, Agent, or Firm*—Baker, Maxham, Jester & Meador

[57] ABSTRACT

A process and equipment for safeguarding the operation of gambling machines with electronic cards in a manner that protects against counterfeiting and fraud. The microchip cards are numbered and a central computer stores at least the amount paid in for playing under the particular card number upon issuing the card. A card is inserted in a gambling machine, which has a read/write unit that compares the amount available for playing with the credit stored under the respective card number in the central computer before releasing the gambling machine for playing. Only if the two amounts match is the machine released for playing and the prevailing credit balance for the card is transmitted continuously during play to the central computer.

21 Claims, 1 Drawing Sheet

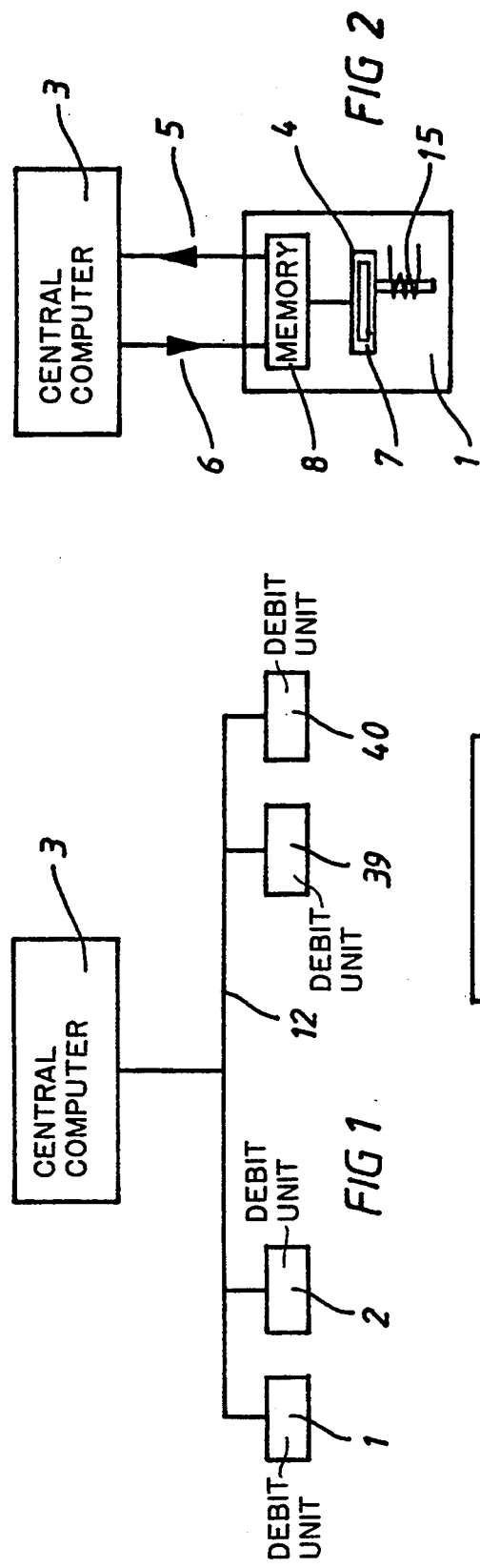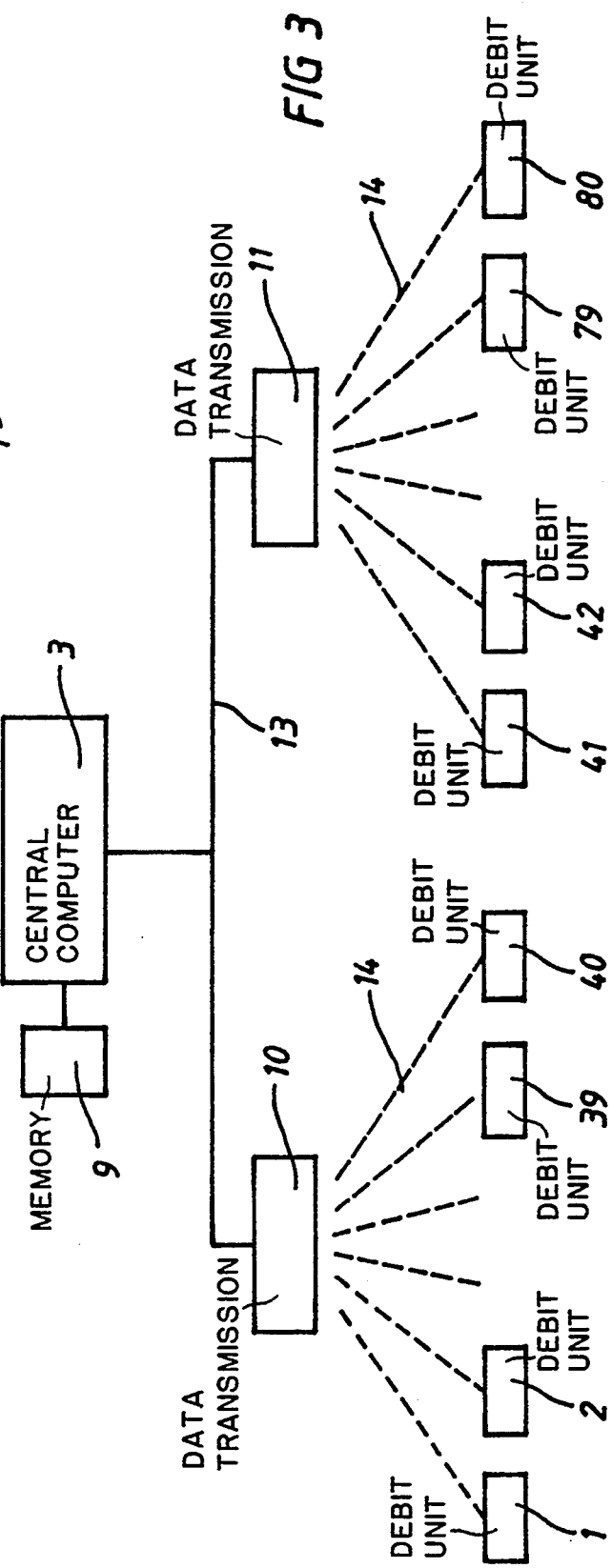

PROCESS AND EQUIPMENT FOR COUNTERFEIT-PROOF OPERATION OF GAMBLING MACHINES WITH CHIP CARDS

FIELD OF THE INVENTION

This invention relates generally to electronic entertainment systems and specifically to a gaming system employing fraud-proof electronic gaming cards.

Description of the Related Art

Equipping cashless gambling machines or slot machines in gambling casinos for the use of "plastic money" would offer many advantages, but all attempts so far have failed due to a lack of methods and equipment for protecting the operation of such machines from counterfeit cards.

This is especially true of the numerous coin-operated machines that also require extensive monitoring and control measures.

SUMMARY OF THE INVENTION

The object of this invention is to provide a process and the equipment required to implement it in order to achieve a practical solution for protecting the operation of such machines from counterfeit cards and chips.

Therefore, according to this invention a process is described that makes it absolutely impossible to counterfeit the credit chips or cards. It consists of first assigning an identification number to each of the chip cards 7 and providing a central computer 3 that stores the amount that has been paid for playing under this identity number when the chip card 7 is created. Each gambling machine 1 has a read/write device 4 that compares the amount available with the credit value stored under the respective card number in the central computer 3 before releasing the machine for play. Only if the values match is the machine cleared for playing and then the prevailing credit balance is relayed continuously to the central computer 3.

BRIEF DESCRIPTION OF THE DRAWING

FIG. 1 is a functional block diagram showing a chain linkage of gambling machines;

FIG. 2 is a schematic diagram illustrating the data exchange between a gambling machine and the central computer; and FIG. 3 is a functional diagram of an illustrative embodiment of the system of this invention.

DETAILED DESCRIPTION OF THE PREFERRED EMBODIMENTS

The process of this invention offers several safeguards against counterfeiting.

The access code is a combination of numbers that changes continuously, namely the card number and the credit balance. A counterfeit card would be recognized immediately and would be documented as such.

Counterfeit cards could be detected easily because in addition to storing the last credit balance in the central computer 3, at least the last playing results that led to said credit balance are also stored in the computer in the process according to this invention.

For this purpose, a computer with a memory 8 that stores at least the last playing results is provided in each gambling machine 1 according to this invention.

In order to facilitate the transfer of numerous data that are generated simultaneously, it is also proposed that the data stored last not be transmitted to the central computer 3 until the end of playing, because under some circumstances one player might make several plays in succession, and interim results are irrelevant for the central computer.

However, it is important for the balance to be compared between the memory 8 of the gambling machine 1 and the last entry posted on the chip card 7 at the end of playing, i.e., before the chip card 7 is removed from the machine.

As a safeguard for a correct data comparison according to this invention, a locking device 15 is provided in the read/write unit 4 to either eject the chip card 7 or release it to be removed only after the comparison has been completed.

Since the control and monitoring of the playing results by financial authorities is an extremely important consideration, it is also herein proposed to provide a WORM memory 9 that can be written only once but can be read as often as desired in the central computer 3 so all the essential postings can be stored there invariably. The abbreviation WORM stands for the English term "WRITE ONCE READ MANY TIMES". With such a system, all postings can be used for documentation purposes because they cannot be manipulated.

Cable linkage of a large number of gambling machines in casinos can be come a problem, so it is also proposed herein that a wireless multiplex data transmission system 10 be provided between the gambling machine 1 and the central computer 3. Such data transmission systems are already in use; they are extremely fast and can connect up to 100 gambling machines in fractions of a second for data exchange with the central computer 3.

A system designed according to this invention can be further expanded by equipping other machines, such as machines for dispensing or collecting money or for services similar to those provided by gambling machines 1, with read/write units 4 and computers with memories 8 and connecting them to the central computer 3. With such a system, it would be possible to handle all sorts of transactions, from paying parking fees to dispensing cigarettes or for purchases in casino boutiques, by means of a chip card 7.

FIG. 1 shows a diagram of a chain linkage of gambling machines that are labelled as 1, 2 to 39 and 40. They are linked to the central computer 3 by way of connecting lines 12 and such an arrangement is capable of guaranteeing protection against counterfeiting in the operation of machines according to this invention.

FIG. 2 shows again schematically the data exchange between a gambling machine 1 and the central computer 3. The gambling machine 1 has a computer with a memory 8 that relays its information over line 5 to the central computer 3 as soon as the chip card 7 has been inserted into the read/write unit 4, and conversely, the memory 8 also receives information from the central computer 3 over a connection 6 and supplies such information again to the chip card 7 by way of the read/write unit 4.

In large casinos, several hundred gambling machines may be in operation under some circumstances, so installation of the respective cables and connecting lines can pose some serious problems.

FIG. 3 also shows a diagram of an economical installation for operation of gambling machines with chip cards that is safeguarded from counterfeiting and manipulation.

FIG. 3 again shows the central computer 3 which is connected by connecting lines 13 to one or more multiplex data transmission systems 10 and 11. FIG. 3 shows forty gambling machines connected to each multiplex system 10 or 11. The data transmission is a wireless process using the transmission pathways 14.

The diagram in FIG. 3 shows only a few wireless connections 14 to gambling machines numbered 1, 2, etc. up to 39, 40, and for the system 11 they are numbered 41, 42, etc. up to 79, 80.

FIG. 3 also shows that the central computer 3 is equipped with a special "WORM" memory system 9 that can be written only once. Such a system is not only necessary to refute any attempts at fraud, but also such a memory that cannot be manipulated is the best prerequisite for acceptance by the finance authorities of the results stored in the central computer as bookkeeping documentation.

Finally, to ensure that the credit values in the central computer 3 and in the chip card 7 match before the card can be removed, FIG. 2 shows that the chip card 7 is not released for ejection or removal until the data comparison concluded with a positive outcome by means of a magnetic locking system 15, for example.

If the card is also to be used for other payment operations in addition to playing, other peripheral units must also be equipped with computers and memories 8 in the same way as the gambling machines.

For example, parking fees and entrance fees can be paid, beverages can be dispensed from a beverage dispenser, or purchases can be made in businesses and boutiques in the casino and paid for with the credit balance on the chip card.

The advantage of this invention is that a closed system for operation of gambling machines with chip cards that is absolutely protected against counterfeiting is created at relatively little expense, and the method of data processing cannot be reasonably rejected even by strict authorities.

It should be emphasized once again that the schematic diagrams are not to be regarded as restrictive and of course they omit certain details, such as the power supply to the individual gambling machines, etc.

What is claimed is:

1. A secure, closed debit card usage system incorporating effective counterfeit protection means, said system comprising:

a debit card adapted to have recorded thereon an identification number and a number representing the amount paid in advance as a credit balance thereon, said identification card and the current credit balance, in combination, comprising a changeable and unique access code for said card;

central processing apparatus having means for assigning and recording on said card the identification number and amount of the initial credit balance paid, the combination comprising the initial access code for said card;

addressable memory means in said central processing apparatus on which is recorded said initial access code, and on which said access code is updated and recorded as the credit balance of said card changes;

at least one credit reducing consumer operating machine coupled to said central processing apparatus and having a read/write unit as an integral element thereof, said read/write unit having means to send to said central processing apparatus the access code of said card upon initial insertion of said card into said read/write unit;

comparator means in said central processing apparatus for comparing the most recently recorded access code stored in said memory means with the access code of said card from said read/write unit in said machine, said central processing apparatus selectively sending an acceptance or rejection signal to said machine representing the results of the comparison process;

means in said machine for releasing said card for use therein by the consumer to reduce the credit balance on said card by means of said read/write unit;

means in said machine for transmitting the reduced credit balance of said card to said central processing apparatus; and means in said central processing apparatus for revising the access code of said card to provide unique identification of said card at each use thereof.

2. The system according to claim 1, wherein said machine has a computer with a memory for storing data including the last results of use of said card in said machine.

3. The system according to claim 2, wherein the last data stored are not transmitted to the central processing apparatus until the end of use of said card in said machine.

4. The system according to claim 3, wherein said memory in said machine is configured with sufficient capacity to store a large number of uses of said card therein until an erase command is issued by the central processing apparatus after data safeguarding.

5. The system according to claim 4, wherein said read/write unit has a locking device that selectively releases said card for removal or ejects it only after the values posted in said memory of said machine and on said card have been compared.

6. The system according to claim 5, wherein said memory means in said central processing apparatus comprises a write once read many times (WORM) memory that can be written only once but can be read as often as desired so that all the essential entries can be stored permanently and are not changeable.

7. The system according to claim 6, and further comprising at least one wireless multiplex data transmission system coupling said machine and said central processing apparatus for the purpose of data transmission.

8. The system according to claim 7, wherein said machine may comprise many different devices such as automatic money dispensing and receiving machines, gambling machines, beverage dispensing machines or other service machines each equipped with a read/write unit and a computer with a memory and is coupled to said central processing apparatus.

9. The system according to claim 5, and further comprising at least one wireless multiplex data transmission system coupling said machine and said central processing apparatus for the purpose of data transmission.

10. The system according to claim 5, wherein said machine may comprise many different devices such as automatic money dispensing and receiving machines, gambling machines, beverage dispensing machines or other service machines, each equipped with a read/write unit and a computer with a memory and is coupled to said central processing apparatus.

11. The system according to claim 4, wherein said memory means in said central processing apparatus comprises a write once read many times (WORM) memory that can be written only once but can be read as often as desired so that all the essential entries can be stored permanently and are not changeable.

12. The system according to claim 4, and further comprising at least one wireless multiplex data transmission system coupling said machine and said central processing apparatus for the purpose of data transmission.

13. The system according to claim 4, wherein said machine may comprise many different devices such as automatic money dispensing and receiving machines, gambling machines, beverage dispensing machines or other service machines, each equipped with a read/write unit and a computer with a memory and are coupled to said central processing apparatus.

14. The system according to claim 2, wherein said memory in said machine is configured with sufficient capacity to store a large number of uses of said card therein until an erase command is issued by the central processing apparatus after data safeguarding.

15. The system according to claim 2, wherein said read/write unit has a locking device that selectively releases said card for removal or ejects it only after the values posted in said memory of said machine and on said card have been compared.

16. The system according to claim 1, wherein said memory in said machine is configured with sufficient capacity to store a large number of uses of said card therein until an erase command is issued by the central processing apparatus after data safeguarding.

17. The system according to claim 1, wherein said read/write unit has a locking device that selectively releases said card for removal or ejects it only after the values posted in said memory of said machine and on said card have been compared.

18. The system according to claim 1, wherein said memory means in said central processing apparatus comprises a write once read many times (WORM) memory that can be written only once but can be read as often as desired so that all the essential entries can be stored permanently and are not changeable.

19. The system according to claim 1, and further comprising at least one wireless multiplex data transmission system coupling said machine and said central processing apparatus for the purpose of data transmission.

20. The system according to claim 1, wherein said machine may comprise many different devices such as automatic money dispensing and receiving machines, gambling machines, beverage dispensing machines or other service machines, each equipped with a read/write unit and a computer with a memory and is coupled to said central processing apparatus.

21. A secure method for using a debit card having effective counterfeit protection means, said method comprising the steps of:
   entering in a central processing apparatus an amount of money paid in advance as a credit balance for the debit card;
   entering on the debit card a unique identification number and signals representing the initial credit balance on the debit card, the combination of the identification number and the credit balance comprising a unique and changeable access code for the debit card;
   entering in memory in said central processing apparatus said access code for the debit card, which access code changes as the credit balance is reduced by use;
   inserting the debit card into a receiving slot in a credit reducing consumer operating machine coupled to the central processing apparatus, the machine having a read/write unit as an integral element thereof;
   reading the access code on the debit card by the read/write unit in the machine;
   transmitting the access code for the debit card to the central processing apparatus;
   comparing the unique access code recorded in the central processing apparatus with the access code read and transmitted by the machine;
   selectively sending an acceptance or rejection signal from the central processing apparatus to the machine, depending upon the results of the comparison between the stored access code and the access code received from the machine;
   releasing the debit card for use by the machine when the machine receives an acceptance signal from the central processing apparatus;
   reducing the credit balance on the debit card by the read/write unit as the debit card is used in the machine, thereby changing the card's unique access code;
   transmitting the signal representing the reduced credit balance for the debit card to the central processing apparatus; and
   revising the access code for the debit card in the central processing apparatus to change the unique identification of the debit card pursuant to use thereof in the machine.

* * * * *